A. C. BADGLEY.
Bee Hive.
No. 70,313.  Patented Oct. 29, 1867.
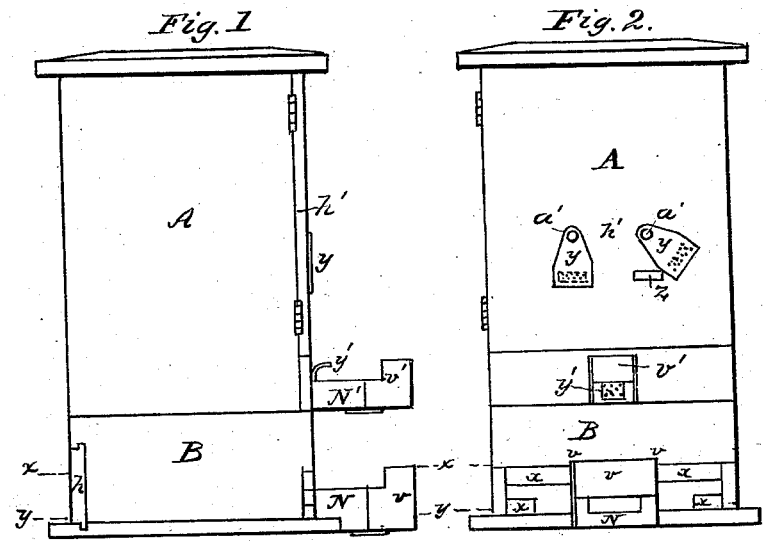
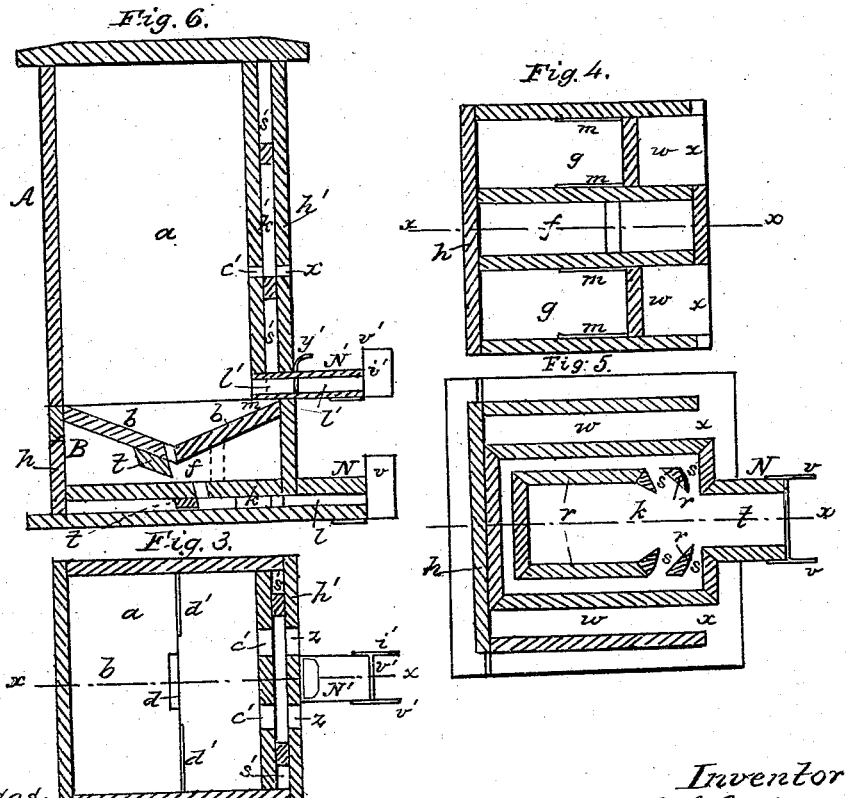
Witnesses:
Inventor:

United States Patent Office.

AARON C. BADGLEY, OF EARLEVILLE, ILLINOIS.

Letters Patent No. 70,313, dated October 29, 1867.

---

IMPROVEMENT IN BEE-HIVES.

---

The Schedule referred to in these Letters Patent and making part of the same.

---

TO ALL WHOM IT MAY CONCERN:

Be it known that I, AARON C. BADGLEY, of Earleville, in the county of La Salle, and State of Illinois, have invented certain new and useful Improvements in Bee-Hives, and that the following is a full, clear, and exact description of the same, reference being had to the accompanying drawing, in which—

Figure 1 represents a side elevation of a bee-hive constructed according to my invention.

Figure 2 represents a front view of the same.

Figure 3 represents a horizontal section of the bee-hive at the line $x$ $x$ of fig. 1.

Figure 4 represents a similar section of the same at the line $y$ $y$ of fig. 1.

Figure 5 represents a similar section of the same at the line $z$ $z$ of fig. 2, and Figure 6 represents a vertical longitudinal section of the same at the line $x$ $x$ of figs. 3, 4, and 5.

My invention is divided into several parts. Its objects are to permit the free escape of dirt from the working apartment of the hive without enlarging the entrance thereto from the exterior of the hive; to enable the bees to guard more effectually against the entrance of strange bees and bee-millers; to mislead such interlopers; to place the entrance of the hive at a place where such interlopers are not likely to congregate; and to impede their entrance.

The bee-hive represented in the accompanying drawing embodies all of my improvements in the best manner in which I have applied them in practice. This bee-hive is composed of mainly two parts, the body A, and the base B. The former is separable from the latter, so that it may be removed for the purpose of hiving a swarm in it, or for other purposes; the two being connected by dowel-pins. The body A contains the working apartment $a$, which is a rectangular chamber, whose bottom is formed by two inclined bottom boards $b$ $b$, which are secured in the base B, and slope downwards from the sides of the bee-hive towards each other, so that the dirt and worms thrown from the comb by the bees pass to the central line of the hive, where three openings, $d$ $d'$ $d'$, are formed. The central opening $d$ is a working opening for the bees, and communicates by a sloping passage, $e$, with a small apartment, $f$, in the base. The two lateral openings are passages for dirt, and communicate with side dirt-receptacles $g$ $g$ in the base, to which access is had from the back of the hive, for the purpose of cleansing them, by the removal of a slide, $h$. This arrangement of openings affords ample space for the discharge of dirt without enlarging the passage for bees. The sides of the dirt-receptacles are lined in the vicinity of the dirt-openings $d'$ $d'$ with plates of sheet tin $m$ $m$, to impede the return of bee-moths to the working apartment after they have been ejected by the bees. The small apartment $f$ communicates by a passage, $e$, with a vestibule, $k$, formed in the base of the hive, and this vestibule communicates with a tubular passage, $l$, formed in a projecting entrance-tube, N, by which the bees enter and leave the hive. Hence, bees when entering have to pass first through the tubular passage $l$ into the vestibule $k$. Then they must pass upward into the intermediate apartment $f$, and thence by the inclined passage $e$ into the working apartment $a$. The vestibule is divided by partitions $r$, which form false passages $s$ $s$ $s$ $s$, which have no communication with the working apartment, so that strange bees and bee-millers which succeed in passing through the tubular entry passage $l$ may be misled. The blocks $t$, which form the ascending gangways to the working apartment, do not extend down to the bottoms of the apartments in which they project, nor touch their sides, so that passages are left beneath them and at their sides for the bee-millers, which, being much lower than bees, and striving to find crevices for the deposit of their eggs, naturally crawl beneath the blocks instead of attempting to ascend them. The tube-entrance N, projecting in front of the hive, has its entrance at a distance from the sides and from the stand upon which it is placed, where the bee-millers congregate, so that but few attempt to enter, and the entrance of these few and of the bee-moths or worms which are hatched outside the hive, is guarded by upright fences $v$ $v$ of sheet tin, upon which the bee-moths crawl with difficulty, while their thin edges present an almost insuperable obstacle to the bee-moth passing towards the entrance of the tube from its sides, as it is difficult for the moth to turn round a thin edge. The entrance-tube also presents a long narrow passage which is easily guarded by the bees against interlopers. The base of the hive, at the sides of the vestibule $k$, and in front of the dirt-receptacles $g$ $g$, is formed into false passages $w$, which communicate with the exterior of the hive by false entrances $x$ $x$, into which the millers and strange bees, being attracted by the scent of the hive, naturally enter, and thereby are misled from the true entrance. The front side of the working apartment is separated from the outside of the hive by a vestibule, $k'$, which communicates with the working apartment by two passage-ways $c'$ $c'$, and with the exterior of the hive by two other passage-ways $z$ $z$. The latter have perforated shutters $y$ $y$ applied to them, so that air is permitted to pass for ventilation, and in case of unusual activity among the bees these shutters may be turned aside, on their pivots $a'$, in the day-time, to permit the bees to enter and leave the hive more rapidly. This front vestibule is surrounded by a false passage, $s'$, to which access is had by an entrance, $m'$, at the bottom of the working aparement, so that bee-millers which may succeed in entering the latter, and are seeking a crevice to lay their eggs in, may enter this false passage, whence they can be removed upon opening the front $h'$ of the hive, which is hung upon hinges for that purpose. The working apartment is also provided at its bottom with a direct passage-way, $l'$, from the exterior, which is to be used mainly for purposes of ventilation, and is therefore provided with a perforated slide, $y'$; but in seasons of unusual activity among the bees this passage may be used as an entrance, and it communicates with a projecting entrance-tube, $N'$, whose mouth is protected by fences $v'$, of thin metal, like the lower entrance-tube N.

It will thus be seen that if the bees are permitted to enter the hive by the lowermost entrance alone, they pass through combinations of a projecting entrance-tube, N, vestibule $k$, and intermediate apartment $f$, to the working apartment. If the bees are permitted to enter by the uppermost passages $z$ $z$, they pass through a vestibule, $k'$, to the working apartment; and if they are permitted to enter by the intermediate passage $l'$, they pass through a projecting entrance-tube, $N'$, to the working apartment. These several modes of entrance, therefore, illustrate several modes in which some parts of my invention may be used independently of others, in case the user sees fit. It will also be perceived that my vestibules, whether at the base or side of the working apartment, are so thin that they cannot be used by the bees for working apartments, and differ in these respects from the additional working apartments which are frequent placed under a hive with a view to draw the bees downwards, and induce them to leave the old comb and use new comb made in the additional apartment as brood-comb.

What I claim as my invention, and desire to secure by Letters Patent, is—

1. The base B, having inclined boards $b$ $b$, forming a bottom for section A, said base being provided with openings $d$ $d'$ $d'$, leading into chambers $f$ $g$ $g$, which chambers are constructed as set forth, having their respective outlets, the whole constructed and arranged in the manner and for the purposes specified.

2. The vestibule $k$, composed of the blocks $r$, having passages $s$ $s$, and leading into the tube N, which extends outside of the hive, and is provided with the metal shields $v$ $v$, when constructed as described, and used in combination with the bottom boards $b$ and chambers $f$ and $g$ $g$, having their communicating passages in the manner and for the purposes set forth.

3. The upper section A, having a front formed into a hinged door, $h'$, which may be opened into the vestibule $k'$, and false passages $s'$ $s'$, which are formed in the front of this section, all constructed and used in the manner and for the purposes set forth.

4. The combination of the sections A B with their tube-entrances N N', having metal shields $v$ $v'$, and vestibule $k'$, with entrance $c'$, the whole constructed, arranged, and operating as herein described.

In testimony whereof I have hereto set my hand this 26th day of December, 1865.

AARON C. BADGLEY.

Witnesses:
J. W. BROWNE,
JOHN S. BLISS.